United States Patent [19]

Ege

[11] Patent Number: 5,167,362

[45] Date of Patent: Dec. 1, 1992

[54] BUTT-SPLICING METHOD

[75] Inventor: Sigmund Ege, Oslo, Norway

[73] Assignee: Kloften and Kloften (U.S.A.), Inc., Boynton Beach, Fla.

[21] Appl. No.: 868,980

[22] Filed: Apr. 16, 1992

Related U.S. Application Data

[63] Continuation-in-part of Ser. No. 668,879, Mar. 13, 1991, Pat. No. 5,125,559.

[51] Int. Cl.⁵ ............... B23K 1/14; B23K 11/087
[52] U.S. Cl. .................. 228/213; 228/216; 228/247; 228/5.7; 219/57; 219/85.14
[58] Field of Search ........... 228/212, 213, 216, 222, 228/244, 247, 250, 5.7; 219/56, 57, 85.1, 85.14, 85.15, 85.21

[56] References Cited

U.S. PATENT DOCUMENTS

| 4,286,744 | 9/1981 | Gullotte et al. | 228/5.7 |
| 4,563,563 | 1/1986 | Ege | 219/85.1 |
| 5,098,009 | 3/1992 | Tsuchida et al. | 228/5.7 |

FOREIGN PATENT DOCUMENTS

| 2725778 | 12/1977 | Fed. Rep. of Germany | 228/5.7 |
| 95950 | 8/1976 | Japan | 228/5.7 |

Primary Examiner—Samuel M. Heinrich
Attorney, Agent, or Firm—Victor F. Volk

[57] ABSTRACT

To splice two metal tapes by means of a solder wire that is thicker than the tapes themselves, their terminal edges are positioned upon one electrode, a spacing shim is inserted upon one of the tapes, another electrode is lowered onto the shim, the wire is inserted into the channel formed by the tape and shim edges and the electrodes, the shim is withdrawn to lower the upper electrode down upon the solder, and the latter is then fused.

5 Claims, 1 Drawing Sheet

BUTT-SPLICING METHOD

This application is a continuation-in-part of my copending application Ser. No. 07/668,879, filed Mar. 13, 1991 now U.S. Pat. No. 5,125,559.

BACKGROUND OF THE INVENTION

In my above-named application Ser. No. 668,879 there is described a method of butt-splicing two metal tapes with hard solder by pushing an end of a long length of solder wire into a channel that is formed by the tape ends and two electrodes. (The ends of the tapes form the side walls of this channel and the electrodes form top and bottom walls.) Then, just when the wire is fused, the tape ends are pushed together so that, when the solder hardens, the two tapes will have been spliced. This method works perfectly when the diameter of the solder does not exceed the thickness of the tapes, but when the solder is larger in diameter than the tape thickness, it cannot enter the described channel, and efforts to push it forward will only cause it to buckle. Hard solder is not readily and economically available nor conveniently handled, however, in diameters substantially less than 10 mils (0.25 mm) while the tape (contact strip) to be spliced may be as thin as 4 mils or less. In any event it is very useful to have a method of tape splicing wherein solder wire of a single size can be used for a wide range of tape thicknesses.

SUMMARY OF THE INVENTION

My method comprises steps of positioning an edge of a first tape upon the upper surface of a lower supporting member such, advantageously, as a carbon electrode, and then positioning an edge of a second tape parallel to that of the first but spaced from it. Thereafter I position the lower surface of an upper confining member, such, advantageously, as a carbon electrode spaced a measured distance above the top surfaces of said tapes. In a preferred method of spacing the upper electrode I insert a shim of a precisely measured thickness upon one of the ends of tape.

A fusible solder wire is then pushed into the chamber being formed by the tape edges and the surfaces of the upper and lower members. The upper electrode is lowered down upon the solder (such as by withdrawing the shim) and a short surge of current is passed through the electrodes to cause the solder to fuse. The edges of the tapes are then pushed closer together so that they are both wetted by molten solder.

DETAILED DESCRIPTION OF PREFERRED EMBODIMENT

Figure 1A:
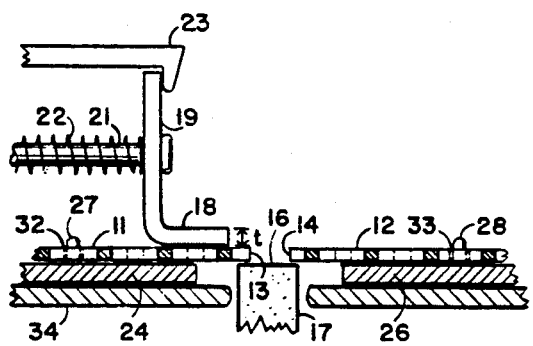
FIGS. 1a–1f show schematic views of the steps of the method of my invention.
Figure 1B:
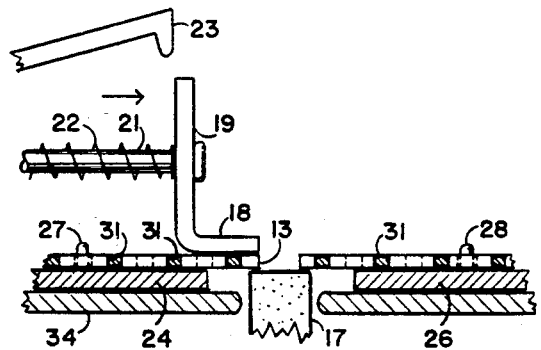

Referring first to FIGS. 1a–1f, in FIG. 1a two tapes 11, 12, which may advantageously be the projecting elements of contact strips, are laid out with their respective edges 13, 14 parallel to each other upon an upper surface 16 of an electrode 17 to which solder does not bond, such as a commercially available carbon brush. A shim 18 of a precisely determined thickness "t" is set back upon the surface of the tape 11 from the edge 13. The shim 18 has a vertical extension 19, which may be integral therewith, by which the shim may be moved horizontally by means of a rod 21 and compression spring 22 and is restrained by a catch 23 which may be hand operated. The tapes 11, 12 are carried, respectively, on commercially known guide bars 24, 26 to which they are fixed laterally by pins 27, 28 projecting upwardly from the guide bars through respective holes 32, 33 in the tapes. Movement of the tapes toward each other is accomplished by sliding the bars 24, 26 in grooves in a platform 34 through which the electrode 17 projects upwardly. Necks 31—31 of connectors that project horizontally from the tapes 11, 12 are shown in section but my method applies equally well to tapes without projections.

Figure 1C:
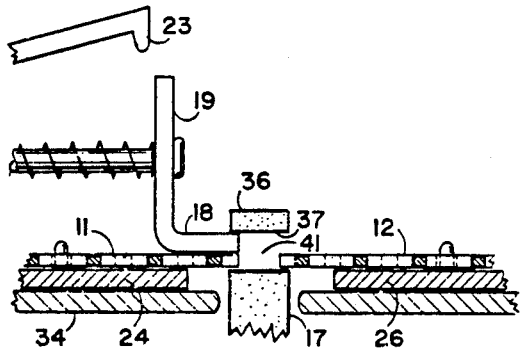
Figure 1D:
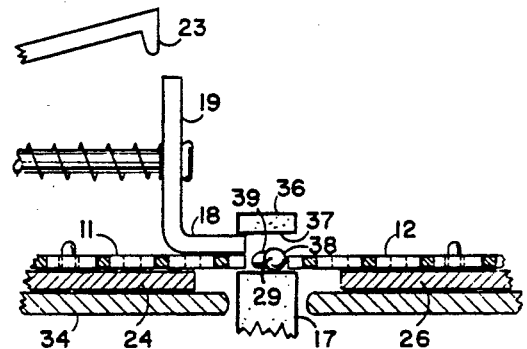

In the next step of my method (FIG. 1b) the catch 23 is released and the shim 18 advanced to be flush with the edge 13. Where the diameter of solder wire does not exceed the thickness of the tapes being spliced and there is no need for the present method the catch 23 need merely not be released and prior used methods can be followed. In FIG. 1c an upper electrode 36 having a surface 37 parallel to the surface 16 of the electrode 17 is lowered down upon the shim 18 forming a confining channel 41. In the next step of my method an end 38 of solder wire 39 is pushed horizontally into this channel (FIG. 1d). This solder wire has a certain curvature since it is, perforce, fed from a spool, and the diameter of the wire should exceed the thickness "t" of the shim 18 to prevent the end 38 from exiting the channel 41 through the opening between the top of the tape 12 and the surface 37 of the electrode 36. Nor should there be any likelihood that a loop of the solder wire will become wedged in this opening. Because a bead 29 forms on the end of the wire supply after a splice has been removed the diameter at the leading edge is somewhat greater than that of the running length. Thus a 10 mil solder wire will typically have a leading bead 14 mils in diameter, and it could not enter the channel formed by tapes even 13 mils thick if it were not for the shim.

Figure 1E:
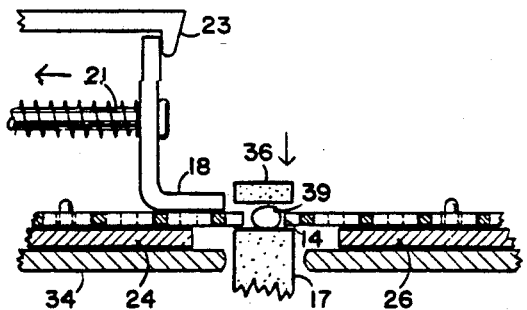
Figure 1F:
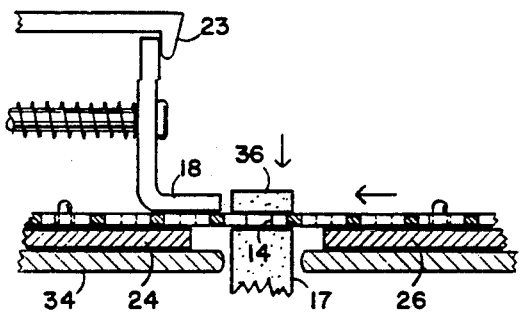

At this time the shim is withdrawn by pulling the rod 21 to the left, permitting the electrode 36 to be lowered upon the solder 39 (FIG. 1e). Current is then passed between the electrodes 16 and 36, quickly heating the edges of the underlying tapes and fusing the solder wire 39 followed by an urging of the slide bar 26 to the left for a precisely predetermined distance so that the edge 14 of the tape pushes against the fused solder to bring it in contact with both tape edges (FIG. 1f). The solder is permitted to solidify, a matter of a few seconds, the electrode 36 is raised, and the spliced tapes lifted from the guide bars 24, 26 with a splice that is, typically, stronger than the tapes themselves.

A solder of 15% Ag, 80% Cu and 5% P is eminently suitable for the wire 39.

The foregoing description has been exemplary rather than definitive of my invention for which a grant of Letters Patent is sought as defined in the appended claims.

I claim:

1. The method of bonding together the edges of metal tapes comprising the steps of:
    (A) positioning a first of said edges of tape upon the upper surface of a lower supporting member,
    (B) positioning a second of said edges of tape upon said surface, said second edge being spaced from and substantially parallel to said first edge,
    (C) positioning a lower surface of an upper confining member at a significant distance of separation above said tapes, (D) pushing a fusible wire into the confining chamber being formed by said first and second edge and said surfaces,
(E) bringing down said upper confining member upon said wire,
(F) heat fusing said wire,
(G) while said wire is fused advancing at least one of said tapes so as to wet both of said edges with the fused metal of said wire,
(H) solidifying said fused metal thereby splicing said tapes.

2. The method of claim 1 comprising the steps of depositing a shim upon the end of one of said tapes to provide said distance of separation and withdrawing said shim to bring down said upper member.

3. The method of claim 1 wherein said lower supporting member and said upper confining member comprise electrodes and said heat fusing of said wire results from electric current passing between said electrodes.

4. The method of claim 3 wherein said electrodes comprise carbon brushes.

5. The method of claim 1 wherein said wire comprises an alloy of silver and said tapes comprise copper.

* * * * *